United States Patent [19]
Nahm et al.

[11] Patent Number: 5,333,690
[45] Date of Patent: Aug. 2, 1994

[54] CEMENTING WITH BLAST FURNACE SLAG USING SPACER

[75] Inventors: James J. W. Nahm; Reece E. Wyant, both of Houston, Tex.

[73] Assignee: Shell Oil Company, Houston, Tex.

[21] Appl. No.: 999,750

[22] Filed: Dec. 31, 1992

[51] Int. Cl.⁵ .............................................. E21B 33/16
[52] U.S. Cl. ................................... 166/291; 166/292; 166/293
[58] Field of Search ....................... 166/291, 292, 293; 175/65

[56] References Cited

U.S. PATENT DOCUMENTS

| | | |
|---|---|---|
| 2,336,723 | 12/1943 | Drummond . |
| 2,582,909 | 1/1952 | Laurence ............................. 166/291 |
| 2,822,873 | 2/1958 | Harmsen et al. . |
| 2,899,329 | 8/1959 | Lyons . |
| 3,077,740 | 2/1963 | Hemwall . |
| 3,111,006 | 11/1963 | Caron . |
| 3,557,876 | 1/1971 | Tragesser . |
| 3,866,683 | 2/1975 | Maly et al. ........................... 166/292 |
| 3,964,921 | 6/1976 | Persinski et al. . |
| 4,014,174 | 3/1977 | Mondshine . |
| 4,276,182 | 6/1981 | Beirute ............................. 166/291 X |
| 4,374,738 | 2/1983 | Kelley ..................................... 507/108 |
| 4,450,009 | 5/1984 | Childs et al. . |
| 4,518,508 | 5/1985 | Conner . |
| 4,530,402 | 7/1985 | Smith et al. . |
| 4,548,270 | 10/1985 | Eilers . |
| 4,592,425 | 6/1986 | Oliver, Jr. et al. . |
| 4,600,057 | 7/1986 | Borchardt . |
| 4,606,772 | 8/1986 | Almond et al. . |
| 4,643,617 | 2/1987 | Kanno et al. . |
| 4,664,713 | 5/1987 | Almond et al. . |
| 4,674,574 | 6/1987 | Savoly et al. . |
| 4,681,165 | 7/1987 | Bannister ....................... 166/291 X |
| 4,690,589 | 9/1987 | Owa . |
| 4,692,065 | 9/1987 | Suzuki et al. . |
| 4,717,488 | 1/1988 | Seheult et al. . |
| 4,746,245 | 5/1988 | Mork . |
| 4,897,119 | 1/1990 | Clarke . |
| 4,924,942 | 5/1990 | Shen ............................... 166/292 X |
| 4,971,709 | 11/1990 | Tillis et al. . |
| 5,016,711 | 5/1991 | Cowan . |
| 5,020,598 | 6/1991 | Cowan et al. . |
| 5,027,900 | 7/1991 | Wilson . |
| 5,058,679 | 10/1991 | Hale et al. . |
| 5,082,499 | 1/1992 | Shen . |
| 5,101,902 | 4/1992 | Parceveaux et al. . |
| 5,106,423 | 4/1992 | Clarke ............................. 166/293 X |
| 5,113,943 | 5/1992 | Wilson et al. . |
| 5,125,455 | 6/1992 | Harris et al. ........................ 166/292 |
| 5,133,806 | 7/1992 | Sakamoto et al. . |
| 5,147,565 | 9/1992 | Bour et al. . |

FOREIGN PATENT DOCUMENTS

| | | |
|---|---|---|
| 61-48454 | 3/1986 | Japan . |
| 833704 | 6/1981 | U.S.S.R. . |
| 2216574A | 3/1989 | United Kingdom . |
| 2223255A | 9/1989 | United Kingdom . |

*Primary Examiner*—George A. Suchfield

[57] ABSTRACT

A spacer fluid containing blast furnace slag is utilized in a well drilling operation. In one embodiment an oil emulsion drilling fluid is displaced using spacer fluid comprising water, blast furnace slag and a surfactant. In another embodiment a spacer fluid comprising blast furnace slag and water is used in the cementing of an annulus surrounding a pipe with a blast furnace slag cementitious slurry.

19 Claims, 1 Drawing Sheet

U.S. Patent
Aug. 2, 1994
5,333,690
FIG. 1
FIG. 2
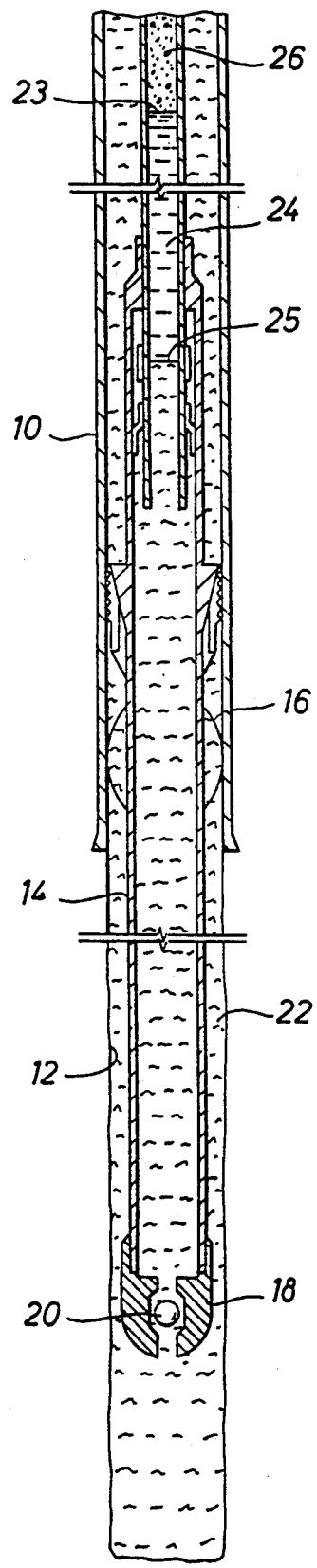
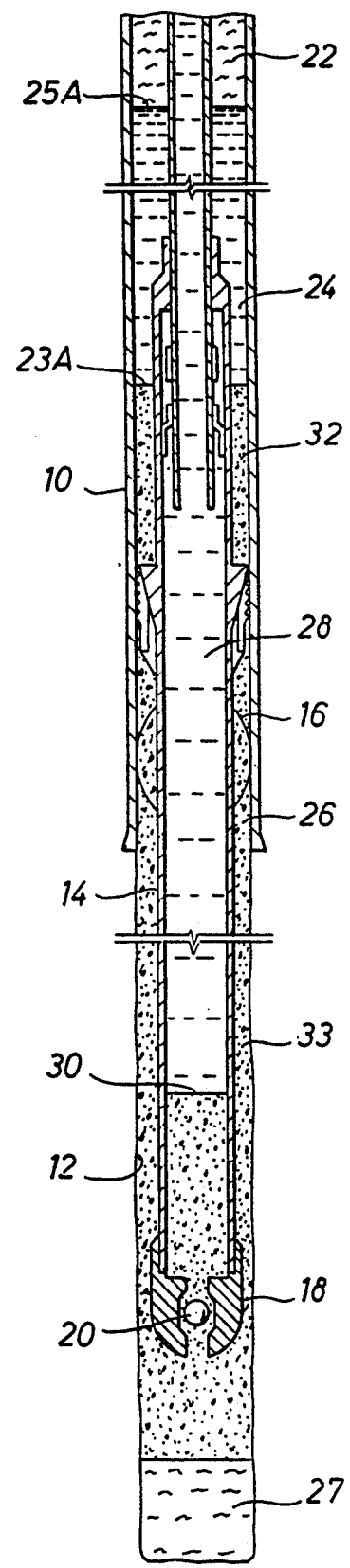

CEMENTING WITH BLAST FURNACE SLAG USING SPACER

BACKGROUND OF THE INVENTION

This invention relates to drilling and cementing boreholes.

The drilling of boreholes is generally carried out using a rotary drilling process. The rotary drilling of a borehole is accomplished by rotating a drill string having a drill pipe and a drill bit at its lower end. Weight is applied to the drill bit while rotating to create a borehole into the earth. The drill string is hollow and sections are added to the drill string to increase its length as the borehole is deepened. This rotary drilling process creates significant amounts of friction which produces heat along with fragments of the strata being penetrated. The fragments of the strata must be removed from the borehole and the drill bit must be cooled to extend its useful life. Both of these necessities are accomplished by the circulation of a fluid down through the drill string and up to the surface between the drill string and the wall of the borehole.

Once the borehole has been drilled to the desired depth, it may be desirable to isolate the separate areas, zones or formations transversed by the borehole. For extraction of fluids from formations, and for protection against borehole collapse, one or more conduits (casings) must be inserted into the borehole extending from the surface downward. Thereafter, liners may be hung inside the casings.

At this point it becomes necessary to fill the annulus between the casing and the borehole wall or between the liner and casing with a cementitious material which will seal the annulus to inhibit communication between various formations penetrated by the wellbore and which will provide structural support for the casing or liner. This is commonly referred to as primary cementing.

Generally, the borehole into which the casing or liner being cemented is introduced is filled with drilling mud. Therein lie several problems. Conventional Portland cement and conventional drilling muds are incompatible. Thus, as the cement is forced down the casing or liner and up into the annulus it is commingled with the drilling mud at any interface between the mud and the cement. The resulting mixture generally becomes a gel and does not set up into a strong cement. In addition, the gel strength and viscosity become uncontrollable and the mixture may either become too viscous to pump or may get thinner. In either event, the situation is unsatisfactory.

The industry has developed a complex system to attempt to circumvent this problem. A device generally known as a landing collar is attached to the bottom of the casing or liner being cemented. The landing collar has an annular shoulder projecting inwardly. A first wiper plug with a diaphragm which can be ruptured is introduced into the casing or liner followed by a spacer fluid, the cementitious slurry and finally, a solid wiper plug. Displacement fluid then pushes the solid wiper plug downward thus displacing the spacer fluid and the cementitious slurry through the ruptured first wiper plug, out of the casing or liner and into an area at the bottom thereof where it changes direction and flows upwardly into the annulus. When the second wiper plug reaches the area of the landing collar it is stopped by the first wiper plug which is resting on the shoulder.

The spacer fluid, however, can create its own set of problems because it mixes somewhat with both the drilling mud ahead of it and the cementitious slurry behind it. Usually, the most damaging is the contamination of the drilling mud. The spacer fluid remains a fluid in admixture with the drilling fluid and thus cannot be easily separated therefrom. In many instances this necessitates the disposing of the thus-contaminated drilling fluid. This is an economic problem with any drilling fluid but with more expensive, less environmentally friendly oil based fluids, it is a major obstacle to successful operation. In addition, the mixture of spacer fluid and drilling fluid usually results in a more viscous material thus exacerbating the pumping problems. This can even result in a total failure of the cement job because a good seal at the top of the liner may not be obtained and this is where any cement weakened by drilling fluid contamination most likely will be.

Slag, broadly, as a cementitious material is shown in Tragessar, U.S. Pat. No. 3,557,876 (Jan. 26, 1971). Clarke, U.S. Pat. No. 4,897,119 (Jan. 30, 1990) discloses blast furnace slag in cement slurries and discusses a variety of particle sizes for the slag and a variety of alternatives to pure water in preparing the slurries. Blast furnace slag for solidifying a drilling fluid is broadly described in Hale et al, U.S. Pat. No. 5,058,679 (Oct. 22, 1991). Oil and water based drilling fluids are disclosed in Shell Internationale patent GB 2,223,255A (Apr. 4, 1990) and Shell Internationale patent GB 2,216,574A (Oct. 10, 1989), respectively. Cowan, U.S. Pat. No. 5,016,711 (May 21, 1991) broadly discloses improved cement adhesion through the use of a surfactant.

SUMMARY OF THE INVENTION

It is an object of this invention to cement a casing or liner without the necessity for a wiper plug or a float collar.

It is a further object of this invention to cement a casing or liner without rendering the drilling fluid useless for further drilling operations.

It is yet a further object of this invention to avoid having to treat a drilling fluid contaminated with cement.

It is yet a further object of this invention to minimize or eliminate disposing of drilling fluid which is contaminated with cement.

It is yet a further object of this invention to avoid viscosity or gelation problems during primary cementing.

In accordance with this invention, a borehole is drilled utilizing a drilling fluid; thereafter a spacer fluid comprising water and blast furnace slag is introduced to displace the drilling fluid followed and/or preceded by a blast furnace slag cementitious slurry.

BRIEF DESCRIPTION OF THE DRAWINGS

In the drawings, forming a part hereof, wherein like reference characters denote like parts in the various views, FIG. 1 is a cross sectional representation of a borehole filled with drilling fluid after a liner has been inserted preparatory to displacing the drilling fluid out with a cementitious slurry; and FIG. 2 is a cross sectional view of the borehole at a later stage in the process wherein the liner is cemented.

DETAILED DESCRIPTION OF THE INVENTION

It has been discovered that by utilizing a spacer fluid containing blast furnace slag, cementing can be carried out without the necessity of using a wiper plug and float collar, and without the viscosity increase or drilling fluid contamination normally associated with spacer fluids.

Definitions

By 'spacer fluid' is meant both true spacer fluids used, generally, between a cementitious slurry and drilling mud, as well as prewash or wash fluids which are generally lower density, lower viscosity compositions which generally contain chemicals such as surfactants. Wash fluids are usually used in larger quantities than spacer fluids and/or are circulated (under conditions sufficient to maintain the necessary pressure).

In this description the term 'cementitious material' means blast furnace slag which, on contact with water or water and activators, hardens or sets into a solidified composition.

A slurry of cementitious material and the component or components which cause it to harden is referred to herein as a 'cementitious slurry'.

By 'direct fluid contact' between the displacement fluid and the cementitious slurry is meant that the displacement fluid directly contacts the upper surface of the column of cementitious slurry as opposed to having a solid wiper plug disposed between the cementitious slurry and the displacement fluid. By 'direct fluid contact' between the spacer fluid and the drilling fluid or mud is meant that the spacer fluid directly contacts the upper surface of the column of drilling fluid or mud in a pipe as opposed to having a wiper plug with a rupturable diaphragm disposed between the spacer fluid and the drilling fluid or mud. This is of particular value in cementing large diameter pipe, i.e. pipe having an outside diameter of 12–30-inches, generally 16-inch or greater.

The term 'pipe' means either a casing or a liner.

The term 'primary cementing' refers to any cementing operation wherein a cementitious slurry is passed into an annulus surrounding a pipe and thus encompasses both the cementing of casings wherein the annulus is between the casing and the borehole wall and the cementing of liners where the annulus includes an annulus between the liner and the casing.

By 'activator system' is meant either a single activator or a mixture of activators used for the setting of blast furnace slag.

As used herein 'down' or 'bottom' as it relates to a drill string or casing, means in a direction toward the farthest reach of the borehole even though in rare instances the borehole can be disposed in a horizontal position. Similarly, 'up' or 'top' means back toward the beginning of the borehole.

Process Detail

Referring now to FIG. 1, there is shown an initial stage in a cementing operation wherein a wellbore has been drilled in a subterranean formation, the drill string removed and a liner is hung in an existing casing. A casing 10 is shown in an upper portion of the wellbore and a further extension of the wellbore as defined by wellbore walls 12 is depicted. Disposed within the wellbore is a liner pipe 14 to be cemented in place. Centralizers 16 center the liner pipe. A casing joint equipped with a float shoe 18 having a valve 20 is affixed to a lower portion of the liner. The borehole from the bottom thereof to a point above the top of the liner, generally all the way to the surface, is filled with drilling fluid or mud from the drilling operation, the drilling fluid or mud being depicted by reference character 22. Spacer fluid 24 is disposed above the drilling fluid in direct fluid contact therewith at interface 25, followed by a cementitious slurry 26. The interface of cementitious slurry 26 and spacer fluid 24 is shown by reference character 23. Some cementitious slurry/spacer fluid mixing occurs at interface 23 and some spacer fluid/drilling fluid mixing occurs at interface 25. Most of the mixing, however, occurs at corresponding interfaces 25A and 23A as depicted in FIG. 2, since flow through the annuli is more subject to mixing forces.

FIG. 2 shows a later stage in the cementitious slurry displacement in accordance with the invention. Drilling fluid 22 has been displaced out of the liner and out of the annulus between the liner and the borehole (and between the liner and the casing), with some remaining in rat hole 27. The cementitious slurry is now displaced into the annulus surrounding the liner by displacement fluid 28. As can be seen, displacement fluid 28 is in direct fluid contact with the cementitious slurry at interface 30.

As can be further seen from FIG. 2, the displacement is stopped with the cementitious slurry/spacer fluid interface 23A near the top of the liner in annulus 32 between the liner and the casing. This is one of the most important areas in the cement job. The present invention results in a good quality cement here rather than a weak mixture of incompatible cement and drilling fluid as in the prior art. This good cement gives a good seal, thus ensuring that the well will pass a top of the liner pressure test.

It is to be noted that in conventional cementing operations a volume of spacer fluid analogous to spacer fluid 24 shown herein will be used such that the annular column of spacer fluid at the stage analogous to that depicted in FIG. 2 would be 500 to 1,000 feet in length. This is because, as noted, in the prior art the spacer fluid, in fact, mixes with the cement below it and the drilling fluids above it. As noted, the same is true in accordance with the invention. There is a region between spacer fluid 24 and drilling fluid 22 as depicted in FIG. 2 wherein there is, in fact, a mixture of drilling fluid and spacer fluid. However, the mixture of spacer fluid 24 in accordance with this invention with drilling fluid 22 does not give a bad reaction because the components of the spacer are compatible with the drilling fluid. This contrasts with Portland cement which, upon hydration, produces calcium hydroxide which is a major source of mud contamination. The blast furnace slag present in the spacer fluid does not give the adverse chemical contamination and adverse reactions with the drilling fluid that are obtained if conventional Portland cement materials become admixed with drilling fluid. Because the blast furnace slag component of spacer fluid 24 is a latent hydraulic material which will eventually set after contact with water, any spacer fluid present in the drilling mud will form a solid with time. This reaction is speeded up by elevated temperatures. Any set solid which is later drilled out can be removed by shale shakers in the normal manner in which cuttings and other solid materials are removed from the drilling fluids. Those particles that may be too small to be removed by the shale shaker will be incorporated into the drilling mud as are normal drill solids. Blast furnace slag does not produce any particles when set that are harmful to the drilling fluid. The setting reactions are completed and thus the set material will not react further to damage the mud. Yet because blast furnace slag in the absence of activators sets so slowly, there is ample time to carry out the cementing operation using the spacer fluid containing blast furnace slag.

Furthermore, since the cementitious slurry 26 is made using blast furnace slag and an activator system (to thus cause more rapid setting) any admixture of the spacer fluid and the cementitious slurry is harmless since the two are fully compatible and any such mixture will simply set and become a strong part of the cement column. Also, the blast furnace slag spacer as described herein normally will not cause harm if mixed with a conventional Portland cement slurry. It would be possible for a Portland cement slurry to have some special ingredients which would be incompatible. Therefore, before any atypical form of Portland cement slurry were used it should be tested for compatibility with the blast furnace slag spacer.

Finally, if there is a miscalculation and too little cementitious slurry is used, the spacer left at the top of the liner or liner lap to be sealed will eventually harden and provide some support to the casing or liner.

While this has been described in connection with the cementing of a liner wherein the cementitious slurry is forced into the annular space 32 between the liner and the casing 10 or the annular space 33 between the liner and borehole 12, it is equally applicable to cementing a casing where the cementitious slurry is forced up into an annulus between a regular casing and the borehole wall, or simply to displacing a drilling fluid out of a wellbore without following with a cementitious slurry.

Spacer fluids made in accordance with this invention can also be used in other primary cementing operations such as cementing a pipe by pumping the cementitious slurry directly into the annulus surrounding the pipe (reverse cementing) and in secondary cementing or remedial cementing operations where a spacer or wash fluid is needed, including squeeze cementing.

In one embodiment, the spacer is between a blast furnace slag/drilling fluid cementitious slurry and a Portland cement cementitious slurry.

Also, a spacer in accordance with this invention can be used to displace drilling fluid for the purpose of introducing a perforation fluid or a packer fluid or any other fluid. One such sequence would be: drilling fluid followed by spacer fluid, followed by sufficient perforation fluid to protect the formation from drilling fluid contamination, followed by spacer fluid (optional) and then drilling fluid. The same sequence could be used for a packer fluid or for other testing as well as for other remedial cementing.

A spacer in accordance with this invention can also be used in a cementing operation to displace out a maximum amount of a very expensive or environmentally unfriendly mud so that the mud could be used for another drilling operation. Also, the spacer fluid of this invention can be used in a plug cementing operation. A spacer can also be used in a plug back cementing operation. This would be similar to the cementing described hereinbefore except that the cementitious slurry, preceded by the spacer and drilling fluid, is pumped to the bottom of the hole and part way up the annulus using the drill pipe. A column of cement slurry is left in the drill pipe equal to the height of the cement slurry in the annulus. The drill pipe is then pulled up to just above the cement slurry and the well is shut in while the cement hardens. The spacer between the cementitious slurry and the drilling fluid in this type of operation is of special value when using an oil based drilling fluid.

Drilling Fluid

The term 'drilling fluid' as used herein includes water or oil based drilling fluids which contain water. These fluids contain at least one other additive such as viscosifiers, thinners, fluid loss additives, dissolved salts, solids from the drilled formations, solid weighting agents to increase the fluid density, formation stabilizers to inhibit deleterious interaction between the drilling fluid and geologic formations, and additives to improve the lubricity of the drilling fluid.

The term 'water-based drilling fluid' is intended to encompass both fresh water muds, salt water-containing muds, whether made from seawater or brine, and other muds having water as the continuous phase including oil-in-water emulsions, as well as essentially oil-free water based muds.

The term 'oil-based drilling fluids' is meant to cover muds having oil as the continuous phase, including low water content oil-base mud and invert oil emulsion mud.

It is sometimes desired that the drilling fluids use water containing dissolved salts, particularly sodium chloride. In these instances, 0.1 to 26 wt %, preferably 3 to 10 wt % sodium chloride may be used. The suitable source is to use seawater or a brine solution simulating seawater. Particularly in the embodiment using blast furnace slag as the cementitious material, the strength of the resulting cement is actually enhanced which is contrary to what would be expected in view of the intolerance of Portland cement to brine. Various salts, including organic salts, are suitable for use in the drilling fluid used in this invention in addition to, or instead of NaCl, including, but not limited to, NaBr, KCl, $CaCl_2$, $NaNO_3$, $NaC_2H_3O_2$, $KC_2H_3O_2$, $NaCHO_2$ and $KCHO_2$. Sodium chloride is usually preferred, as noted above. These salts can be used, if desired, from 0.1 wt % up to the saturation point under the conditions employed.

The invention is applicable to both oil based or water based drilling fluids. However, the advantage is greater with oil based fluids in that they are more expensive and hence the ability, through the use of this invention, to avoid destructive contamination, and thus waste, of the expensive oil based mud is of great economic and ecological significance. Indeed, the invention is particularly applicable for use with oil based drilling fluids utilizing the new and very expensive synthetic oils which are biodegradable or which are formulated to avoid sheen. The drilling fluids recovered can be reused. In some instances, recovered fluids are conditioned with additives before reuse.

Spacer Fluid

The spacer fluid of this invention must be aqueous. That is, it must be oil-free (or at least low oil content) or must be an oil-internal aqueous emulsion. It is generally free of or essentially free of any chemical activators for the blast furnace slag. The spacer fluid must contain blast furnace slag. When used with oil based drilling muds, the spacer fluid preferably contains a surfactant. When used in displacing water based drilling fluids a surfactant is optional.

The amount of blast furnace slag utilized in the spacer fluid is generally an amount such as to make the density between the density of the cement and the density of the mud being displaced. Generally, blast furnace slag is used in an amount to give a spacer fluid density of 8.5 to 19 lbs/gal, preferably 10 to 14 lbs/gal, more preferably 10 to 12 lbs/gal. The amount of blast furnace slag can, however, vary from 20 to 600 lbs/bbl of total spacer fluid, preferably 50 to 300 lbs/bbl. Weighting agents can be used to adjust the density of the drilling fluid if desired. Also, as noted hereinabove, the spacer fluid density may not necessarily be between that of a drilling fluid and a cementitious slurry. In some cases, it may be lower density and may be viewed as a wash fluid. In such instances, blast furnace slag in an amount with the range of about 1 to about 200, preferably 10–100 lbs/bbl may be used.

Other ingredients including the optional surfactant may be present in the spacer fluid including conventional drilling fluid additives. Such additives include fluid loss additives, cuttings/wellbore stabilizers, viscosifiers and, as needed, thinners/dispersants and weight agents.

A preferred fluid loss additive is clay, such as prehydrated bentonite. Other suitable fluid loss additives include carboxymethylated starches, starches, carboxymethyl cellulose, synthetic resins such as "POLY-DRILL" by SKW Chemicals, sulfonated lignite, lignites, lignin, or tannin compounds. Weight materials include barite, calcium carbonate, hematite and MgO, for example. Suitable cuttings/wellbore stabilizers include hydrolyzed polyacrylonitrile, partially hydrolyzed polyacrylamide, salts including NaCl, KCl, sodium or potassium formate, sodium or potassium acetate, polyethers and polycyclic and/or polyalcohols. Viscosifying additives include biopolymers, starches, attapulgite and sepiolite. A particularly suitable biopolymer is a welan gum sold by Kelco Oil Field Group Inc. under the trade name "BIOZAN". This polymer is described in U.S. Pat. No. 4,342,866. Suitable thinners include chrome and chrome-free lignosulfonates, sulfonated styrene maleic-anhydride and polyacrylate may also be used depending upon the mud type and mud weight.

However, such additives are not always essential since the spacer fluid can consist essentially of blast furnace slag and water.

The optional surfactant is preferably a material of the type commonly thought of as surfactants, i.e., one with a relatively high degree of detergency, as opposed to materials which may exhibit only a weak amount of detergency such as the lignosulfonates which are sometimes employed in drilling fluids. That is, it is preferably a material which is capable of producing oriented layers or micelies. When used in spacer fluids for displacing oil based drilling fluids the surfactant should be used in a concentration sufficient to avoid significant increase in viscosity upon mixing of the spacer fluid with the oil based drilling fluid.

Usually, the surfactants as sold commercially in the oil industry are 33–75 volume percent active ingredient in a solvent such as an alcohol. Broadly, about 0.05 to about 50 lbs/bbl, preferably 0.1 to 15 lbs/bbl, most preferably 1 to 10 lbs/bbl can be used but this can vary depending on the particular surfactant and the composition of the total drilling fluid. These values are for active ingredients based on total volume of final spacer fluid. Stated in terms of the water phase in the spacer slurry, the surfactant is generally used in an amount within the range of about 0.05 to about 20 volume percent, preferably 0.2 to 10 volume percent, most preferably 2 to 7 volume percent based on the volume of water in the spacer slurry. The surfactant can be either ionic, nonionic, or amphoteric, preferably nonionic or anionic, most preferably anionic, although all surfactants broadly are intended to be included. Suitable surfactants include 1. Alkanol amides (nonionic):

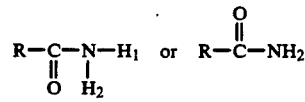

where R=a carbon chain (alkyl group) of 8–20 carbons (usually 10–18); $H_1$ and/or $H_2$ may be replaced by an alkanol such as ethanol or isopropanol. One or both of the H's may be replaced.

Examples: lauric monoisopropanol amide, lauric diethanol amide, coconut diethanol amide. "ALKAMIDE 2106®" by Alkaril Chemicals, Ltd. is a coconut diethanol amide suitable for this application.

2. Ethoxylated alkyl aryl sulfonate:

Examples: nonyl phenol sulfonate with 8 moles ethylene oxide, and N-decyl benzene sulfonate with 6 moles ethylene oxide.

3. Amine oxides (nonionic):

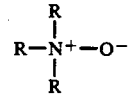

where R=alkyl carbon chains from 1 to 20 carbons, usually one chain is 10 to 18 carbons. Alkyl groups can have hydroxyl or amido functional groups in their chain.

Examples: bis (2-hydroxyethyl) coco amine oxide, bis (2-hydroxyethyl) laurel amine oxide, laurel dimethyl amine oxide, coco amidopropyl dimethyl amine oxide, cetyl dimethyl amine oxide, myristyl dimethyl amine oxide.

4. Betaines and Betaine Derivatives

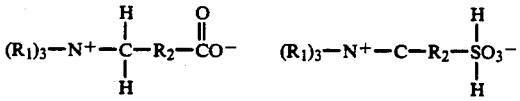

where $R_1$=alkyl chain length between 3 and 20 carbons, $R_2$=alkyl chain length between 1 and 4 carbons. Amide functional groups may be incorporated into the $R_1$ alkyl chain.

Examples: coco amido propyl betaine ($R_2$=propyl group 3 carbons), laurel betaine ($R_1$=laurel group of 12 carbons, no $R_2$), coco betaine ($R_1$=coco group of 12–14 carbons, no $R_2$), oleyl betaine ($R_1$=oleyl group of 18 carbons, no $R_2$), myristic betaine ($R_1$=myristyl group of 14 carbons, no $R_2$), oleamido propyl betaine, isostearamido propyl betaine, laurel sulfobetaine.

5. Ethoxylated Alcohols (nonionic):

Ethoxylated simple alcohols with linear or branched chains having between 8 and 20 carbons with 3 to 20 moles of ethylene oxide groups; 6–14 moles of ethylene oxide are typical.

Examples: $C_9-C_{11}$ linear alcohol with 8 moles ethylene oxide, $C_{14}-C_{15}$ linear alcohol with 13 moles ethylene oxide, $C_{12}-C_{15}$ linear alcohol with 9 moles ethylene oxide.

6. Sulfates and Sulfonates of Ethoxylated Alcohols (anionic):

The same ranges apply as in No. 5 supra except ethylene oxide moles may vary between 2 and 14.

Examples: $C_{12}-C_{13}$ linear alcohol sulfate or sulfonate with 3 moles ethylene oxide, $C_{12}-C_{15}$ linear alcohol sulfate or sulfonate with 3 moles ethylene oxide.

7. Ethoxylated Alkyl Phenols (nonionic):

Alkyl chains of 8 to 20 carbons, usually between 4 and 14 carbons and more preferred to be 8 or 9 carbons, with 4-20 moles of ethylene oxide, usually between 7 and 20 moles and more preferred to 8-12 moles.

Examples: Nonylphenol with 9 moles ethylene oxide, octylphenol with 8 moles ethylene oxide.

8. Sulfates or Sulfonates of Ethoxylated Alkyl Phenols (and their salts) (anionic)

Examples: Nonyl phenol sulfate or sulfonate with 9 moles ethylene oxide; octyl phenol sulfate or sulfonate with 8 moles ethylene oxide.

9. Fluorocarbon-based Surfactants (nonionic, amphoteric, anionic):

These must be water-soluble forms. Fluorocarbon esters such as 3M Company's "FC-740" are oil soluble and not appropriate for this use. 3M Company's "FC-100", "FC-129", "FC-170C" are commercially available examples of fluorocarbon-based surfactants used in the invention.

Examples: Fluoro-octyl sulfonate or sulfate, perfluorated quaternary ammonium oxide, and fluorinated $C_9-C_{11}$ alcohols with 7 moles ethylene oxide.

10. Phosphate Derivatives of Ethoxylated Alcohols:

Examples: $C_{14}-C_{16}$ linear alcohols phosphate with 8 moles ethylene oxide; phosphated nonylphenol with 10 moles ethylene oxide.

11. Quaternary Ammonium Chloride (cationic):

Dimethyl dicoco ammonium chloride, cetyl dimethyl benzyl ammonium chloride, cetyl dimethyl ammonium chloride.

12. Sulfates or Sulfonates of Alcohols (and their salts) (Artionic):

Sulfated simple alcohols with carbon chains of 8-20, usually between 10 and 16 and most common 10-12.

Examples: Sodium lauryl sulfate or sulfonate, potassium lauryl sulfate or sulfonate, magnesium lauryl sulfate or sulfonate, sodium n-decyl sulfate or sulfonate, triethanol amine laurel sulfate or sulfonate, sodium 2-ethylhexyl sulfate or sulfonate.

13. Condensation Products of Ethylene Oxide and Propylene Glycol (nonionic):

Examples: Propoxylated $C_9-C_{14}$ alcohols with 6 moles ethylene oxide.

Especially preferred are nonylphenol ethoxylates, coco amido betaine, blends of N-alkyl coco trimethyl ammonium chloride and bis(2-hydroxyethyl) cocoamide oxide, blends of ethoxylated trimethylnonanol and perfluoro quaternary ammonium oxide, $C_{12}-C_{15}$ linear alcohol ethoxylate sulfate, $C_9-C_{11}$ linear alcohol ethoxylate sulfates, sodium lauryl sulfate, and ethoxy alcohol sulfates.

Blast Furnace Slag Detail

By 'blast furnace slag' is meant the hydraulic refuse from the melting of metals or reduction of ores in a furnace. Such material is disclosed in the Hale et al. U.S. Pat. No. 5,058,679 (Oct. 22, 1991), the disclosure of which is incorporated herein by reference.

The preferred blast furnace slag used in this invention is a high glass content slag produced by quickly quenching a molten stream of slag at a temperature of between 1400° C. and 1600° C. through intimate contact with large volumes of water. Quenching converts the molten stream into a material in a glassy state having hydraulic properties. At this stage it is generally a granular material that can be easily ground to the desired degree of fineness. Silicon dioxides, aluminum oxides, iron oxides, calcium oxide, magnesium oxide, sodium oxide, potassium oxide, and sulphur are some of the chemical components in slags. Generally, the blast furnace slag used in this invention has a particle size such that it exhibits a Blaine specific surface area between 2,000 cm/g and 15,000 cm/g, preferably between 3,000 cm/g and 15,000 cm/g, more preferably between 4,000 cm/g and 9,000 cm/g, most preferably between 4,000 cm/g and 8,500 cm/g. An available blast furnace slag which fulfills these requirements is marketed under the trade name "NEWCEM" by the Blue Circle Cement Company. This slag is obtained from the Bethlehem Steel Corporation blast furnace at Sparrows Point, Md.

A usual blast furnace slag composition range in weight percent is: $SiO_2$, 30-40; $Al_2O_3$ 8; CaO, 35-50; MgO, 0-15; iron oxides, 0-1; S, 0-2 and manganese oxides, 0-2. A typical specific example is: $SiO_2$, 36.4; $Al_2O_3$, 16.0; CaO, 43.3; MgO, 3.5; iron oxides, 0.3; S, 0.5; and manganese oxides, <0.1.

Cementitious Slurry

The cementitious slurry comprises blast furnace slag. As previously noted, with blast furnace slag cementitious slurries the unavoidable mixing of spacer fluid and cementitious slurry is of no consequence since they are thoroughly compatible.

The amount of blast furnace slag in the cementitious slurry will generally be in the range of from about 20 lbs/bbl to about 600 lbs/bbl, preferably 100 lbs/bbl to 500 lbs/bbl, most preferably 150 lbs/bbl to 350 lbs/bbl. This slurry can be made by combining the blast furnace slag with water or with a drilling fluid as disclosed in said Hale et al. patent.

Blast furnace slag having relatively small particle size is frequently desirable when used to form the cementitious slurry because of the greater strength it imparts in many instances to a final cement. Thus, a spacer fluid containing blast furnace slag with a particle size such that it exhibits a Blaine specific surface area within the range of 2,000 to 8,000 $cm^2/g$, generally 4,000 to 7,000 $cm^2/g$ can be used economically, followed by a blast furnace slag cementitious slurry utilizing blast furnace slag having a particle size such that it exhibits a Blaine specific surface area within the range of greater than 7,000 $cm^2/g$ to 25,000 $cm^2/g$, generally 8,000 to 15,000 $cm^2/g$, which produces higher set strengths but which is more expensive. The same blast furnace slag can, however, be used in both the spacer and the blast furnace slag cementitious slurries.

Characterized in terms of particle size the term "fine" can be used to describe particles with a Blaine specific surface area in the range of 4,000 to 7,000 $cm^2/g$, corresponding to 16 to 31 microns in size; "microfine" can be used to describe those particles with a Blaine specific surface area from greater than 7,000 $cm^2/g$ to 10,000 $cm^2/g$ that correspond to particles of 5.5-16 microns in size and "ultrafine" can be used to describe particles with a Blaine specific surface area over 10,000 cm$^2$/g that correspond to particles 5.5 microns and smaller in size. Small particle size blast furnace slags are available from Blue Circle Cement Co., Koch Industries, Tulsa, Okla., under the trade name "WELL-CEM", and from Geochem under the trade name "MICROFINE MC100".

However, it is very time consuming to grind blast furnace slag to these particles sizes. It is not possible to grind blast furnace slag in a manner where particles are entirely one size. Thus, any grinding operation will give a polydispersed particle size distribution. A plot of particle size versus percent of particles having that size would thus give a curve showing the particle size distribution.

In accordance with a preferred embodiment of preparing the cementitious slurry using blast furnace slag, a blast furnace slag having a polydispersed particle size distribution exhibiting at least two nodes on a plot of particle size versus percent of particles in that size is utilized. It has been found that if only a portion of the particles are in the ultrafine category, the remaining, indeed the majority, of the slag can be ground more coarsely and still give essentially the same result as is obtained from the more expensive grinding of all of the blast furnace slag to an ultrafine state. Thus, a grinding process which will give at least 5% of its particles falling within a size range of 1.9 to 5.5 microns offers a particular advantage in economy and effectiveness. More preferably, 6 to 25 wt % would fall within the 1.9 to 5.5 micron range. The most straightforward way of obtaining such a composition is simply to grind a minor portion of the blast furnace slag to an ultrafine condition and mix the resulting powder with slag ground under less severe conditions. Even with the less severe conditions there would be some particles within the fine, microfine or ultrafine range. Thus, only a minority, i.e., as little as 4 wt % of the slag, would need to be ground to the ultrafine particle size. Generally, 5 to 25 wt %, more preferably 5 to 10 wt % can be ground to the ultrafine particle size and the remainder ground in a normal way thus giving particles generally in a size range of greater than 11 microns, the majority being in the to 31 micron range.

Unlike the spacer fluid which is free or essentially free of activators, the blast furnace slag cementitious slurry generally contains an activator system to speed up the setting process.

Suitable activators include lithium hydroxide, lithium carbonate, sodium silicate, sodium fluoride, sodium silicofluoride, magnesium hydroxide, magnesium oxide, magnesium silicofluoride, zinc carbonate, zinc silicofluoride, zinc oxide, sodium carbonate, titanium carbonate, potassium carbonate, sodium hydroxide, potassium hydroxide, potassium sulfate, potassium nitrite, potassium nitrate, calcium hydroxide, sodium sulfate, copper sulfate, calcium oxide, calcium sulfate, calcium nitrate, calcium nitrite, and mixtures thereof. A mixture of caustic soda (sodium hydroxide) and soda ash (sodium carbonate) is preferred because of the effectiveness and ready availability. When mixtures of alkaline agents such as caustic soda and soda ash are used the ratio can vary rather widely since each will function as an accelerator alone. Preferably, about 1 to 20 lbs/bbl of caustic soda, more preferably 2 to 6 lbs/bbl of caustic soda are used in conjunction with from 2 to 50 lbs/bbl, preferably 2 to 20 lbs/bbl of soda ash. The references to 'lbs/bbl' means pounds per barrel of final cementitious slurry.

In some instances, it may be desirable to use a material for a particular effect along with the activator even though it may also act as a retarder. For instance, a chromium lignosulfonate may be used as a thinner in the cementitious slurry along with the activator even though it also functions as a retarder.

Other suitable thinners include chrome-free lignosulfonate, lignite, sulfonated lignite, sulfonated styrene maleic-anhydride, sulfomethylated humic acid, naphthalene sulfonate, a blend of polyacrylate and polymethacrylate, an acrylamideacrylic acid copolymer, phenol sulfonate, dodecylbenzene sulfonate, and mixtures thereof.

EXAMPLE 1

This Example simulates the mixing that would inevitably occur between a spacer and a drilling mud while pumping in the pipe or annulus. In this Example the drilling mud is an 11.9 lbs/gal oil based mud sold under the trade name "NOVADRILL" by the MI Drilling Fluids Company. This mud is formulated using the "NOVASOL" non-sheening synthetic oil. In this Example a blast furnace slag spacer slurry made up of seawater, prehydrated bentonite, a dispersant, a fluid loss additive, blast furnace slag and a surfactant was mixed with the "NOVADRILL" mud referred to hereinabove at two difference volumetric ratios and then tested. The theological properties for a 75% spacer/25% "NOVADRILL" mixture and a 50%/50% mixture are shown as Runs 1 and 2, respectively. The rheological properties of the "NOVADRILL" oil based mud at 120° F. and at room temperature are shown as Runs 3 and 4, respectively. Run 5 shows the rheological properties for the spacer fluid.

| | | | FANN VISCOMETER RHEOLOGY DATA | | | | | | | | Yield | |
|---|---|---|---|---|---|---|---|---|---|---|---|---|
| Run | Composition, Vol % | | Test Temp. | Torque Readings at Varying RPM | | | | | | Plastic Viscosity | Point lb/100 | Gels+++ lb/100 |
| No. | S.S.S.* | ND** | °F. | 600 | 300 | 200 | 100 | 6 | 3 | CP | Ft$^2$ | Ft$^2$ |
| 1 | 75 | 25 | 75 | 39 | 21 | 16 | 10 | 3 | 5 | 18 | 3 | 2/— |
| 2 | 50 | 50 | 75 | 94 | 54 | 40 | 26 | 14 | 16 | 40 | 14 | 14/— |
| 3 | 0 | 100 | 120 | 151 | 92 | 72 | 47 | 17 | 15 | 59 | 33 | 23/42 |
| 4 | 0 | 100 | 75 | 294 | 171 | 125 | 76 | 22 | 20 | 123 | 48 | 23/37 |
| 5 | 100 | 0 | 75 | 122 | 68 | 42 | 18 | 3 | 2 | 54 | 14 | 3/9 |

| 12.5 lb/gal Blast Furnace Slag Spacer Slurry Composition: | | 11.9 lb/gal NOVADRILL Mud Formulation | |
|---|---|---|---|
| | | "NOVASOL"$^{2A}$, BBL | 0.55 |
| Seawater | 0.654 bbl | CaCl$_2$ brine, bbl | 0.26 |
| 30 lb/bbl PHB$^{1A}$ | 0.066 bbl | "NOVAMUL"$^{2B}$, lbs | 5 |
| "SPERSENE" (Reg.)$^{1B}$ | 2.0 lbs | "NOVAWET"$^{2C}$, lbs | 2 |
| "HALAD" 413$^{1C}$ | 1.5 lbs | Lime, lbs | 6 |

-continued

| Run No. | Composition, Vol % S.S.S.* | ND** | Test Temp. °F. | Torque Readings at Varying RPM 600 | 300 | 200 | 100 | 6 | 3 | Plastic Viscosity CP | Yield Point lb/100 Ft$^2$ | Gels+++ lb/100 Ft$^2$ |
|---|---|---|---|---|---|---|---|---|---|---|---|---|
| "NEWCEM"$^{1D}$ "SEM-7"$^{1E}$ | 255 lbs 1 gal | | | "VG-69"$^{2D}$, lbs Barite, lbs | | | | | | 4 216 | | |

$^{1A}$Prehydrated bentonite
$^{1B}$Trade name of MI Drilling Fluids for chrome-free lignosulfonate dispersant
$^{1C}$Trade name of Halliburton polymer-grafted lignosulfonate fluid loss additive
$^{1D}$Trade name of Blue Circle Cement Co. for ground blast furnace slag of about 5500 Blaine Specific Surface Area
$^{1E}$Trade name of Halliburton for non-ionic surface active agent, about 50 volume percent active ingredient
$^{2A}$Trade name of MI Drilling Fluids for Synthetic Oil
$^{2B}$Trade name of MI Drilling Fluids for primary emulsifier
$^{2C}$Trade name of MI Drilling Fluids for wetting agent
$^{2D}$Trade name of MI Drilling Fluids for organophilic clay
**"NOVADRILL", trade name of MI Drilling Fluids for drilling fluid containing sheen-free synthetic oil
+++10 second gel strength/10 minute gel strength Portions of the Run 1 and Run 2 mixtures were tested in Halliburton Ultrasonic Cement Analyzer (UCA) equipment at 278° F. and 3,000 psi for 19 hours. The sample of Run 1 hardened to a strength of about 200 psi. The sample of Run 2 hardened slightly a strength of about 30 psi.

The remaining portions of Runs 1 and 2 were static heat aged at 210° F. for 16 hours. The samples gelled and had water separations of 15% and 24%, respectively, but they refluidized easily with stirring.

This Example shows that mixtures of the blast furnace slag spacer with the synthetic oil based drilling fluid did not exhibit unreasonably high viscosities.

The data also show that the mixtures of the inventive spacer fluid and conventional synthetic oil based drilling fluid, when allowed to set for a period of time, will produce a solid material. While strengths of 200 and less than 30 psi do not indicate a structurally significant strength, they do demonstrate that the materials are solid and thus can be removed from the drilling fluid.

EXAMPLE 2

The blast furnace slag spacer slurry of Example 1 and the synthetic oil drilling mud of Example 1 were mixed in three ratios shown as Run Nos. A, B and C hereinbelow. The blast furnace slag spacer slurry containing the 1 gal/bbl surfactant had been aged for 27 hours at room temperature when mixed with the oil based mud.

Effect of Static Aging of Blast Furnace Slag Spacer Synthetic Oil Mud Mixtures at 210° F. for 16 Hours

| Run No. | Vol. Ratio Spacer/Mud | "SEM-7$^1$" (gal/bbl) | Physical Appearance$^2$ | Hardness Scale$^3$ | Free Water (Vol %) | Wettability |
|---|---|---|---|---|---|---|
| A | 75/25 | 1.0 | Dark Gray, Set | 8 | 0% | — |
| B | 50/50 | 1.0 | Dark Gray, Set | 6.5 | 10% | — |
| C | 25/75 | 1.0 | Dark Gray, Not set | — | — | Oil wet |

$^1$Trade name of Halliburton for anionic surface active agent
$^2$Dark gray color indicates hydration of the blast furnace slag, which reflects the onset of hardening
$^3$Spatula Hardness Scale is 0–10, 0 being a liquid, 9 a solid with compressive strength of about 150 psi, 10 being a solid that cannot be penetrated by the spatula.

These data again show that any contamination of the drilling fluid in accordance with this invention results in a material which forms a solid and thus can be removed from the drilling fluid.

The sample of Run C was a dark gray, indicating that the slag's setting reaction had occurred. There was, however, such a low amount of the slag present that the solidifying particles could not bind together to produce a solid mass. These solidified particles may be too small to be removed by the shale shaker but have reacted and will not damage the mud. In addition, the mixtures are oil wet and will not cause rheological problems with the remaining oil mud.

Other runs were made using a blend of ionic and nonionic surfactants but there was no significant difference in the results.

While these examples used clay, clay-free spacers have also been made.

EXAMPLE 3

This Example shows the advantages of using a surfactant in the blast furnace slag cementitious system which is used to displace an oil based drilling fluid. This Example contrasts the results obtained with and without the addition of the surfactant to a blast furnace slag cementitious slurry used to directly displace the oil based mud. The effects noted here are similar to but are somewhat greater than those to be expected from the use of the surfactant in a spacer slurry to displace the oil based mud. This Example simulates the advantage of using a surfactant in the spacer fluid and exemplifies the advantage of using a surfactant in a blast furnace slag cementitious slurry when directly displacing an oil base mud.

| 14 lb/gal Cementitious Slurry | SM-1 | SM-2 |
|---|---|---|
| PHB slurry[1], bbl | 0.067 | 0.067 |
| Seawater, bbl | 0.58 | 0.58 |
| "SPERSENE" (Reg.)[2], lb/bbl | 2.0 | 2.0 |
| "RESINEX[3]", lb/bbl | 4.0 | 4.0 |
| "HALAD" 413[4], lb/bbl | 3.0 | 3.0 |
| NaOH, lb/bbl | 1.25 | 1.25 |
| $Na_2CO_3$, lb/bbl | 3.0 | 3.0 |
| "NEWCEM"[5] lb/bbl | 350 | 350 |
| "SEM-7,"[6] lb/bbl | 0 | 8.3 |

[1]Fresh water slurry containing 30 lbs prehydrated bentonite per barrel
[2]Trade name of MI Drilling Fluids for chrome lignosulfonate dispersant
[3]Trade name of MI Drilling Fluids for sulfonated lignite/resin dispersant and fluid loss control agent
[4]Trade name of Halliburton polymer-grafted lignosulfonate fluid loss additive
[5]Trade name of Blue Circle Cement Co. for ground blast furnace slag of about 5500 Blaine Specific Surface Area
[6]Trade name of Halliburton for anionic surface active agent, about 50 volume percent active ingredient

CONTROL 1

This control simulates the effect of using a blast furnace slag cementitious slurry to displace directly an oil external drilling mud, not employing a spacer. The oil based drilling fluid, sold under the trade name "VERSACLEAN" by MI Drilling Fluids is formulated using an "ESCAID" mineral oil. The "ESCAID OIL"110 is a treated, light weight petroleum distillate mineral oil made by Exxon.

A spacer slurry is desirable for the displacement of oil external drilling muds.

| Rheology Data | $\Theta_{600}$ | $\Theta_{300}$ | $\Theta_{200}$ | $\Theta_{100}$ | $\Theta_6$ | $\Theta_3$[4] | PV/YP[5] | Gels[6] |
|---|---|---|---|---|---|---|---|---|
| 15.2 lb/gal Slurry[1] | 259 | 139 | 97 | 54 | 7 | 6 | 120/19 | — |
| 95/5[2] | 284 | 152 | 105 | 58 | 7 | 6 | 130/20 | — |
| 75/25 | 336 | 233 | 162 | 89 | 14 | 11 | 103/130 | — |
| 50/50 | 274 | 173 | 111 | 64 | 11 | 9 | 101/72 | — |
| Oil Mud[3] | 70 | 39 | 28 | 17 | 4 | 3 | 31/8 | 9/45 |

[1]15.2 lb/gal Blast Furnace Slag Formulation

| | |
|---|---|
| Drilling Mud | 0.6787 bbl |
| "SPERSENE"[1A] (Reg) | 3.5 ppb |
| $Na_2CO_3$ | 14 ppb |
| NaOH | 4 ppb |
| "NEWCEM"[1B] | 300 ppb |

[1A]Trade name of MI Drilling Fluids for chromium lignosulfonate
[1B]Trade name of Blue Circle Cement Co. for ground blast furnace slag of about 5500 Blaine Specific Surface Area
[2]Volume Ratio of 15.2 lb/gal Slurry:Oil Mud
[3]Oil Mud
Density 13.7 lb/gal
% Oil, 62
% Water, 12
% Solids, 26
Electrical Stability 691 volt
Chloride 25,000 mg/l
Plastic Viscosity = 31 cp
Yield Point = 8 lb/100 ft$^2$
Gels = 9/45 lb/100 ft$^2$
Oil to Brine Ratio-82:18
[4]Values refer to torque readings at the indicated RPM on Fann 35 instrument
[5]Plastic Viscosity, CP/Yield Point, lb/100 ft$^2$
[6]10 second gel strength/10 minute gel strength in lb/100 ft$^2$ The relatively high viscosity and yield point indicate that even with a relatively thin oil based mud, a spacer slurry preferably containing a surfactant is desirable for the displacement of oil external drilling muds, or else a blast furnace slag cementitious composition containing a surfactant should be used.

CONTROL 2

| | FANN VISCOSITY DATA AT ROOM TEMPERATURE | | | | | | | | | | |
|---|---|---|---|---|---|---|---|---|---|---|---|
| | Composition, Vol % | | | Torque Readings at Variable RPMs | | | | | | Plastic Viscosity | Yield Point | Gels+++ |
| Run | SM-1 | SM-2 | NDM++ | 600 | 300 | 200 | 100 | 6 | 3 | CP | lb/100 ft$^2$ | lb/100 ft$^2$ |
| 1 | 100 | | | 29 | 15 | 10 | 6 | 1 | 1 | 14 | 1 | 1/— |
| 2 | | 100 | | 52 | 27 | 19 | 10 | 1 | 1 | 25 | 2 | 1/8 |
| 3 | | | 100 | 112 | 61 | 43 | 24 | 5 | 4 | 51 | 10 | 7/12 |
| 4 | 75 | | 25 (A) | 193 | 125 | 95 | 53 | 5 | 3 | 68 | 57 | 7/— |
| 5 | 50 | | 50 (B) | 295 | 138 | 103 | 69 | 20 | 19 | 157 | −19 | 30/— |
| 6 | 25 | | 75 (C) | 98 | 49 | 33 | 20 | 5 | 4 | 49 | 0 | 5/— |
| 7 | | 75 | 25 (D) | 266 | 163 | 102 | 70 | 4 | 4 | 103 | 60 | 12/— |
| 8 | | 50 | 50 (E) | 192 | 107 | 77 | 55 | 13 | 9 | 85 | 22 | 9/— |
| 9 | | 25 | 75 (F) | 111 | 60 | 44 | 25 | 4 | 3 | 51 | 9 | 4/— |

(A) A slightly grainy mix. No large drops of NDM visible but not as smooth as Run 7
(B) Heavy, lumpy, large Curds of SM-1 within the oil base
(C) Small flocs of "SM-1" within the oil base mud.
(D) Very smooth Mix, no visible drops of NDM, within the "SM-1", i.e., $H_2O$ external.
(E) Small flocs of "SM-2" within the oil base mud.
(F) Very smooth mix, no visible drops of "SM-2" within the oil base mud.
+++10 second gel strength/10 minute gel strength
++NDM-"NOVADRILL" mud as described in Example 1

| Rheology Data | $\Theta_{600}$ | $\Theta_{300}$ | $\Theta_{200}$ | $\Theta_{100}$ | $\Theta_6$ | $\Theta_3$[3] | PV/YP[4] | Gels[5] |
|---|---|---|---|---|---|---|---|---|
| 14 lb/gal Slurry[1] | 72 | 38 | 27 | 15 | 4 | 3 | 34/4 | — |
| 95/5 | 122 | 72 | 53 | 32 | 10 | 10 | 50/22 | — |
| 75/25 | 450 | 460 | 430 | 380 | 210 | 180 | — | |
| 50/50 | 680 | 570 | 470 | 240 | 110 | 90 | 110/460 | |
| 11.9 lb/gal NOVADRILL[2] | 294 | 171 | 125 | 76 | 22 | 20 | 123/48 | 23/37 |
| After Mixing at 180° F. for 1.0 Hour | | | | | | | | |
| 95/5 | 230 | 180 | 150 | 120 | 65 | 50 | 50/130 | 50/— |
| 75/25 | Too thick to measure | | | | | | | |
| 50/50 | 910 | 610 | 480 | 325 | 100 | 85 | 300/32 | 120/— |

[1]14 lb/gal Blast Furnace Slag Cementitious Slurry Formulation

| | |
|---|---|
| Seawater | 0.606 bbl |
| 30 lb/bbl PHB[1A] | 0.074 bbl |
| "RESINEX"[1B] | 4 lbs |
| "SPERSENE" (Reg.)[1C] | 1 lb |
| Citric Acid | 2.5 lbs |
| NaOH | 1.0 lb |
| "NEWCEM"[1D] | 350 lbs |

[1A]Prehydrated bentonite
[1B]Trade name of MI Drilling Fluids for sulfonated lignite/resin dispersant and fluid loss control agent.
[1C]Trade name of MI Drilling Fluids for chromium lignosulfonate dispersant
[1D]Trade name of Blue Circle Cement Co. for ground blast furnace slag of about 5500 Blaine Specific Surface Area
[2]Trade name of MI Drilling Fluid for drilling fluid containing sheen-free synthetic oil
[3]Values refer to torque readings at the indicated RPM on Fann 35 instrument
[4]Plastic Viscosity, CP/Yield Point, lb/100 ft$^2$
[5]10 second gel strength/10 minute gel strength in lb/100 ft$^2$ This Control shows the preference for employing a spacer fluid when dealing with an oil external emulsion drilling fluid. The oil external emulsion drilling fluid was mixed with a blast furnace slag cementitious slurry as would occur during displacement of the mud by the cementitious slurry if no spacer slurry were used. The resulting high plastic viscosities and yield points again indicate that with this oil base drilling mud relatively poor displacement and channeling would occur during the cementing operations. The rheological data was obtained after stirring the samples at elevated temperature for one hour and shows that the deleterious effects of mixing the materials would become progressively worse as the cementing operations continued.

CONTROL 3

This Control shows the adverse effect of using a conventional spacer in conjunction with a synthetic oil drilling mud. As can be seen, the 50/50 mixture exhibited a yield point of 129 which is excessive and could cause poor displacement and channeling during the cementing operations. This compares with 14 for 50/50 mixture in accordance with the use of the spacer fluid of the invention as shown in Example 1.

The relatively high viscosity and yield point indicate that even with a relatively thin oil based mud, a surfactant is needed in the context of spacer fluids for oil external muds.

| Rheology Data | $\Theta_{600}$ | $\Theta_{300}$ | $\Theta_{200}$ | $\Theta_{100}$ | $\Theta_6$ | $\Theta_3$[3] | PV/YP[4] | Gel[5] |
|---|---|---|---|---|---|---|---|---|
| 13.5 lb/gal "MCS-3" Spacer[1] | 42 | 22 | 16 | 10 | 4 | 3 | 20/2 | — |
| 50/50 | 175 | 152 | 112 | 68 | 15 | 12 | 23/129 | |
| 12.5 lb/gal "NOVADRILL"[2] | 274 | 144 | 108 | 68 | 20 | 18 | 130/14 | |

[1]Conventional aqueous spacer containing 3 gal/bbl MSCA surfactant (mixture of nonionic surfactants, specific gravity 1.025) sold under trade name "MCS-3" by B.J. Services,
[2]Trade name of MI Drilling Fluids for drilling fluid made using non-sheening synthetic oil
[3]Values refer to torque readings at the indicated RPM on Fann 35 instrument
[4]Plastic Viscosity, CP/Yield Point, lb/100 ft$^2$
[5]10 second gel strength/10 minute gel strength in lb/100 ft$^2$ While this invention has been described in detail for the purpose of illustration, it is not to be construed as limited thereby, but is intended to cover all the changes and modifications within the spirit and scope thereof.

What is claimed is:

1. A method for drilling a well, comprising:
   drilling a borehole with a drill string utilizing a drilling fluid, thus producing a used drilling fluid;
   removing said drill string and disposing a pipe within said borehole, said used drilling fluid thus being disposed in said pipe and in an annulus surrounding said pipe;
   introducing a spacer fluid comprising a granulated water-quenched blast furnace slag and water into said pipe;
   thereafter passing a cementitious slurry comprising water, granulated water-quenched blast furnace slag and an activator system into said pipe; and
   thereafter displacing said cementitious slurry into at least a portion of said annulus surrounding said pipe.

2. A method according to claim 1 wherein said water of said spacer fluid contains dissolved salts.

3. A method according to claim 1 wherein said water of said spacer fluid is seawater.

4. A method according to claim 1 wherein said activator system is selected from the group consisting of sodium silicate, sodium fluoride, sodium silicofluoride, magnesium silicofluoride, magnesium hydroxide, magnesium oxide, zinc silicofluoride, zinc oxide, zinc carbonate, titanium carbonate, sodium carbonate, potassium sulfate, potassium nitrate, potassium nitrite, potassium carbonate, sodium hydroxide, potassium hydroxide, copper sulfate, lithium hydroxide, lithium carbonate, calcium oxide, calcium nitrate, calcium nitrite, calcium hydroxide, sodium sulfate and mixtures thereof.

5. A method according to claim 1 wherein 5 to 25 wt % of said blast furnace slag of said cementitious slurry has an ultrafine particle size.

6. A method according to claim 1 wherein said drilling fluid contains seawater, said water of said spacer fluid and said water of said cementitious slurry comprise seawater, said activator system is a mixture of sodium hydroxide and sodium carbonate:
wherein said blast furnace slag is present in said spacer fluid in an amount sufficient to give a density of 12 to 14 lbs/gal;
wherein said cementitious slurry contains 150 to 350 lbs/bbl of said cementitious material; and
wherein said cementitious slurry is displaced up into said annulus by direct fluid contact with a displacement fluid comprising seawater.

7. A method according to claim 1 wherein said pipe is a casing and said annulus is the space between said casing and said borehole.

8. A method according to claim 1 wherein said pipe is a liner and said annulus is the space between said liner and a casing.

9. A method according to claim 1 wherein said drilling fluid is an invert emulsion and said spacer fluid contains a surfactant.

10. A method according to claim 9 wherein the oil of said invert emulsion is a synthetic oil.

11. A method according to claim 1 wherein said spacer fluid contains, in addition, clay.

12. A method according to claim 1 wherein said spacer fluid contains a surfactant.

13. A method according to claim 12 wherein said surfactant is an anionic surfactant.

14. A method according to claim 1 wherein said blast furnace slag is present in said spacer fluid in an amount sufficient to give a spacer fluid weight within the range of 12 to 14 lbs/gal.

15. A method for drilling and cementing a well, comprising:
drilling a borehole with a drill string utilizing an invert emulsion oil drilling fluid, thus producing a used drilling fluid;
removing said drill string and disposing a pipe within said borehole, said used drilling fluid thus being disposed in said pipe and in an annulus surrounding said pipe;
introducing a spacer fluid comprising water and sufficient granulated water-quenched blast furnace slag to give a density within the range of 12 to 14 lbs/gal into said pipe in direct fluid contact with said used drilling fluid;
passing a cementitious slurry comprising water and 150 to 350 lbs/bbl based on total volume of cementitious slurry of granulated water-quenched blast furnace slag and an activator system comprising a mixture of 2 to 6 lbs/bbl of caustic soda and 2 to 20 lbs/bbl of soda ash based on total barrels of said cementitious slurry down said pipe into direct fluid contact with said spacer fluid, said spacer fluid being free of activators for said blast furnace slag; and
displacing said cementitious slurry into said annulus surrounding said pipe through direct fluid contact by a displacement fluid comprising seawater.

16. A method according to claim 15 wherein said spacer fluid comprises, in addition, a fluid loss additive, a salt and a dispersant.

17. A method according to claim 16 wherein said fluid loss additive is a polymer-grafted lignosulfonate, said dispersant is a chrome-free lignosulfonate and said salt comprises NaCl.

18. A method for cementing a pipe in a wellbore comprising:
introducing a blast furnace slag cementitious slurry into said wellbore;
thereafter introducing a spacer fluid comprising granulated water-quenched blast furnace slag and water into said wellbore in direct fluid contact with said blast furnace slag cementitious slurry, said spacer fluid being essentially free of activators for said blast furnace slag; and
thereafter introducing a Portland cement cementitious slurry into said wellbore in direct fluid contact with said spacer fluid.

19. A method for drilling a well, comprising:
drilling a borehole with a drill string utilizing a drilling fluid, thus producing a used drilling fluid;
removing said drill string and disposing a pipe within said borehole, said used drilling fluid thus being disposed in said pipe and in an annulus surrounding said pipe;
introducing a spacer fluid comprising granulated water-quenched blast furnace slag and water into said pipe;
thereafter passing a cementitious slurry comprising water and blast furnace slag into said pipe; and
thereafter displacing said cementitious slurry into at least a portion of said annulus surrounding said pipe.

* * * * *